United States Patent

[11] 3,625,215

| | | |
|---|---|---|
| [72] | Inventor | Sverre Quisling<br>1240 Sherman Ave., Madison, Wis. 53703 |
| [21] | Appl. No. | 53,529 |
| [22] | Filed | July 9, 1970 |
| [45] | Patented | Dec. 7, 1971 |

[54] DENTAL SHEATHS
1 Claim, 3 Drawing Figs.

[52] U.S. Cl............................................... 128/260, 32/1
[51] Int. Cl................................................ A61m 7/00
[50] Field of Search.................................... 32/1, 17, 14 B; 128/260

[56] References Cited
UNITED STATES PATENTS

| | | | |
|---|---|---|---|
| 1,728,137 | 9/1929 | Riddle........................ | 32/17 |
| 2,579,965 | 12/1951 | Robinson..................... | 32/17 |
| 3,416,527 | 12/1968 | Hoef........................... | 128/260 |

*Primary Examiner*—Robert Peshock
*Attorneys*—Joseph G. Werner, Theodore J. Long, John M. Winter and James A. Kemmeter ABSTRACT: A disposable dental sheath of plastic-coated absorbent paperboard for applying medicament gels and liquids to the teeth and gums and covering recently filled or otherwise treated teeth, defective or missing teeth, and orthodontic appliances. The sheath has a curved front panel integrally connected along a foldline to a rear panel which is divided into a series of tabs overlapped in fantail relation. The medicament is placed in the sheath for treatment of the teeth and gums. The front panel may have an outline of teeth formed thereon along the foldline.

PATENTED DEC 7 1971 3,625,215

INVENTOR:
SVERRE QUISLING

DENTAL SHEATHS

BACKGROUND OF THE INVENTION

This invention relates generally to the field of dental applicances and more particularly to a disposable dental sheath for covering the teeth and gums and applying a medicament thereto.

Several years ago encouraging results of a test regarding the topical application of a fluoride compound to school children's teeth were reported by the National Institute of Dental Research. Under the 2-year test, for 6 minutes each school day the children wore U-shaped plastic mouthpieces specifically conformed to their teeth in a manner similar to athletic mouthguards. The trough of the mouthpiece was filled with a 1.1 percent sodium fluoride gel which was maintained in intimate contact with the teeth by the mouthpiece. A substantial reduction in tooth decay was reported. It was necessary, of course, to thoroughly clean and sanitize the mouthpieces after use each day.

Generally in the past, local analgesic medicaments for the tooth and gum areas have been applied by an injection in the appropriate area of the gum, while decay and disease preventive medicaments have generally been applied by painting or brushing them on the teeth and gums.

SUMMARY OF THE INVENTION

Basically, the invention comprises a dental sheath formed from a plastic-coated paperboard blank designed to be placed in the mouth about the teeth and gums. The blank is formed into the general shape of a mouthpiece by folding the front panel upwardly about a foldline and overlapping the rearwardly extending tabs in fantail fashion. The paperboard when wetted can be easily sucked into position about the teeth and gums.

The paperboard blank provides a very economical, sterile and disposable dental sheath which may be placed over recently filled or otherwise treated teeth giving time for cement to harden, continued treatment, or the like.

The sheath also provides means for topically applying medicaments to teeth and gum areas. Dentists now commonly treat the teeth with fluoride compounds using brush-type applicators. For lasting action, such as hardening teeth using medicaments such as sodium chloride, stannous fluorides, and phosphate fluorides, longer action is desired. For treatment of diseases of the gums such as gingivitis where hydrogen peroxides, potassium chlorate and potassium permanganates are employed, extended application to the affected gum areas may also be desirable. To remove dextran plaques on teeth which harbor bacteria and often result in cavities, vitamin C and enzymes such as dextranase have been employed. These treatments also require multiple applications of preferably longer duration than merely painting the teeth with an applicator. For toothaches, the application of oil of cloves, wintergreen, pontacaine, or other local analgesics are relieving. My invention provides an economical and sterile means for making topical applications of such medicaments, particularly in the gel and liquid form, to the teeth and gum areas.

The blank is formed into the generally desired shape and the medicament is placed therein. The medicament-containing sheath is then placed in the mouth and worked into the proper form and positioned about the area to be treated. The paperboard sheath confines the medicament to the area to be treated without spreading to the rest of the mouth, tongue or cheek. The sheath does not require individual special tailoring, however, if only one side of the mouth or a smaller area is to be treated, a suitable portion of the blank may be removed by cutting.

My invention thus provides a very economical and sanitary manner of topically applying medicaments to the teeth and gum areas. The paperboard sheath may be disposed of after each use, thus eliminating the problems of contamination and cleaning accompanying reusable devices.

The outside of the front panel of the sheath has an outline of teeth thereon for aesthetic purposes during use and to provide a temporary cover for defective or missing teeth or for orthodonic appliances.

DESCRIPTION OF A PREFERRED EMBODIMENT

Figure 1:
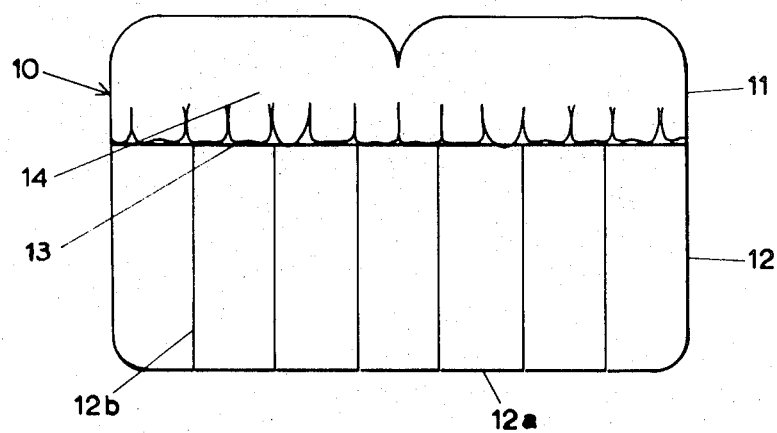
FIG. 1 is a plan view of a paperboard blank from which the dental sheath is formed.
Figure 2:
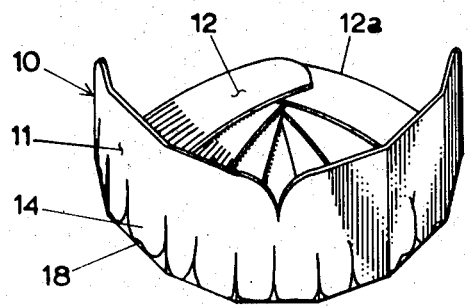
FIG. 2 is a frontal perspective view of a dental sheath formed from a paperboard blank such as shown in FIG. 1.

Referring now more particularly to the drawings wherein like numerals refer to like parts throughout the several views, FIG. 1 shows a flexible paperboard blank at 10 which is formed into the dental sheath illustrated in FIG. 2. The blank 10 has a front panel 11 integrally connected to a rear panel 12 along a scored foldline 13. The rear panel 12 is divided into a plurality of tabs 12a by slits 12b.

While the paperboard itself is absorbent, the outside surface of the blank (i.e., the front side of the front panel and the bottom side of the rear panel) is coated with a water impervious flexible plastic coating 14. This particular construction, while allowing absorption of medicament in liquid or gel form, prevents the sheath from being soaked completely through and, thus, gives the sheath the required wet strength during use.

In use, the blank is formed into a dental sheath by folding the front panel 11 upwardly along foldline 13 into a substantially upright position. The rear panel tabs 12a are then pivoted together in overlapping fantail relation as shown in FIG. 2.

Figure 3:
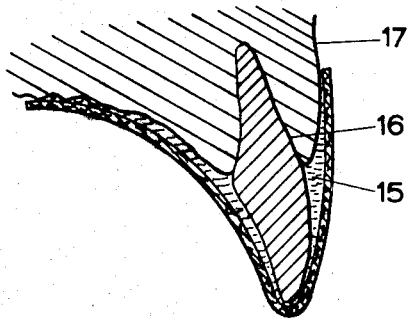
FIG. 3 is a sectional view showing a medicament gel being applied to a tooth and gum area with the dental sheath.

A liquid or gel medicament, such as the gel shown at 15 in FIG. 3, is placed on the inner paperboard surface of the sheath in the trough formed by the front and rear panels.

The medicament containing sheath is then placed over the teeth and gums and worked into position with finger, tongue and sucking action.

When using the sheath merely to cover recently filled or treated teeth, defective teeth, missing teeth or orthodonic appliances, the medicament, of course, would not be applied.

As shown in FIGS. 1 and 2, an outline of teeth 18 is printed on the front panel 11 along the foldline for aesthetic purposes during use.

It is understood my invention is not confined to the particular construction and arrangement of parts herein illustrated and described, but embraces all such modified forms thereof as come within the scope of the following claims.

I claim:

1. A flexible paperboard blank for forming a dental sheath for wearing about the teeth and gums, said blank comprising; a front panel and a rear panel connected to said front panel along a substantially straight scored foldline, said rear panel having a plurality of slits extending substantially transversely to said foldline dividing said rear panel into a plurality of tabs, the distal ends of said tabs being pivotable in overlapping fantail relation with one another when said front panel is folded upwardly substantially transverse to said rear panel and said blank is folded so that said foldline takes a U-shaped configuration.

* * * * *